(12) United States Patent
Yoshida

(10) Patent No.: US 6,417,632 B1
(45) Date of Patent: Jul. 9, 2002

(54) DEFLECTION APPARATUS AND CONTROL METHOD THEREOF

(75) Inventor: Masahiro Yoshida, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/550,873

(22) Filed: Apr. 17, 2000

(30) Foreign Application Priority Data

Apr. 16, 1999 (JP) .......................................... 11-109346

(51) Int. Cl.7 ................................................ G09G 1/04
(52) U.S. Cl. ...................... 315/371; 315/399; 315/411; 348/540; 348/516
(58) Field of Search ............................. 315/364, 368.18, 315/371, 391, 399, 409, 411; 348/377, 516, 521, 540

(56) References Cited

U.S. PATENT DOCUMENTS

| | | | | |
|---|---|---|---|---|
| 5,994,852 A | * | 11/1999 | Lee | 315/408 |
| 6,081,079 A | * | 6/2000 | Lee | 315/369 |
| 6,119,225 A | * | 9/2000 | Kim | 713/1 |
| 6,252,360 B1 | * | 6/2001 | Ito et al. | 315/411 |

FOREIGN PATENT DOCUMENTS

| | | |
|---|---|---|
| JP | 1-71380 | 3/1989 |
| JP | 4-29471 | 1/1992 |
| JP | 07143356 | 6/1995 |
| JP | 10177362 | 6/1998 |
| JP | 11136534 | 5/1999 |
| JP | 11146223 | 5/1999 |

* cited by examiner

*Primary Examiner*—Haissa Philogene
(74) *Attorney, Agent, or Firm*—Ratner & Prestia

(57) ABSTRACT

A deflection apparatus capable of generating a stable deflection pulse in a deflection output circuit even when turning on the power source or changing over the frequency of horizontal synchronizing signal is disclosed. A pulse width modulation (PWM) controlled power supply circuit generates a supply voltage for obtaining a desired horizontal amplitude depending on the frequency of horizontal synchronizing signal. The PWM voltage controller discriminates the frequency of horizontal synchronizing signal, and controls the output voltage of the PWM controlled power supply circuit. An oscillation frequency switching controller discriminates the frequency of horizontal synchronizing signal, and outputs a frequency changeover signal to an oscillator so as to be an optimum oscillation frequency depending on the output voltage of the PWM controlled power supply circuit. The oscillator outputs a horizontal oscillation pulse at a frequency controlled by the output of the oscillation frequency switching controller, in synchronism with the horizontal synchronizing signal. A horizontal deflection output circuit generates a deflection current synchronized with a horizontal oscillation pulse.

20 Claims, 14 Drawing Sheets

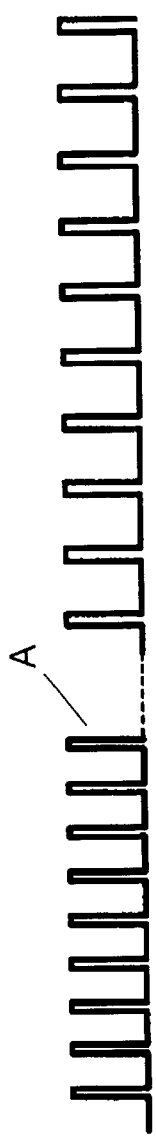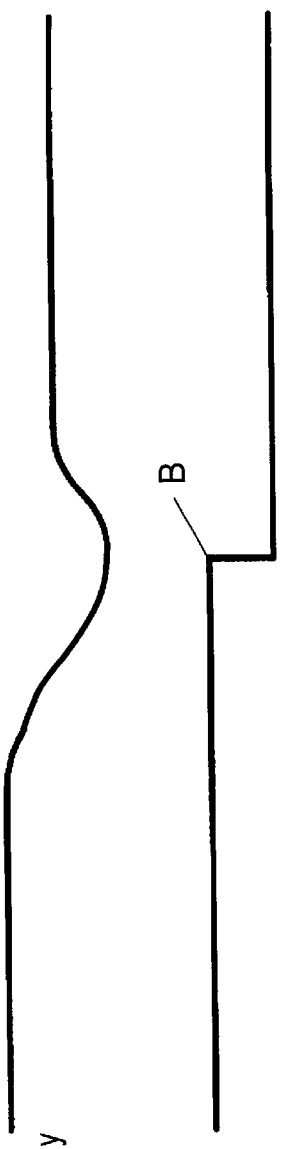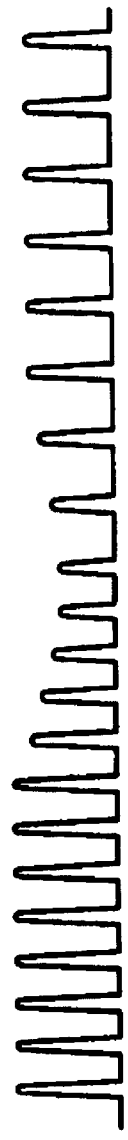
FIG. 2a Horizontal sync signal
FIG. 2b PWM controlled power supply circuit output voltage +B1
FIG. 2c Oscillation frequency switching controller output voltage
FIG. 2d Oscillator output voltage
FIG. 2e Deflection pulse voltage

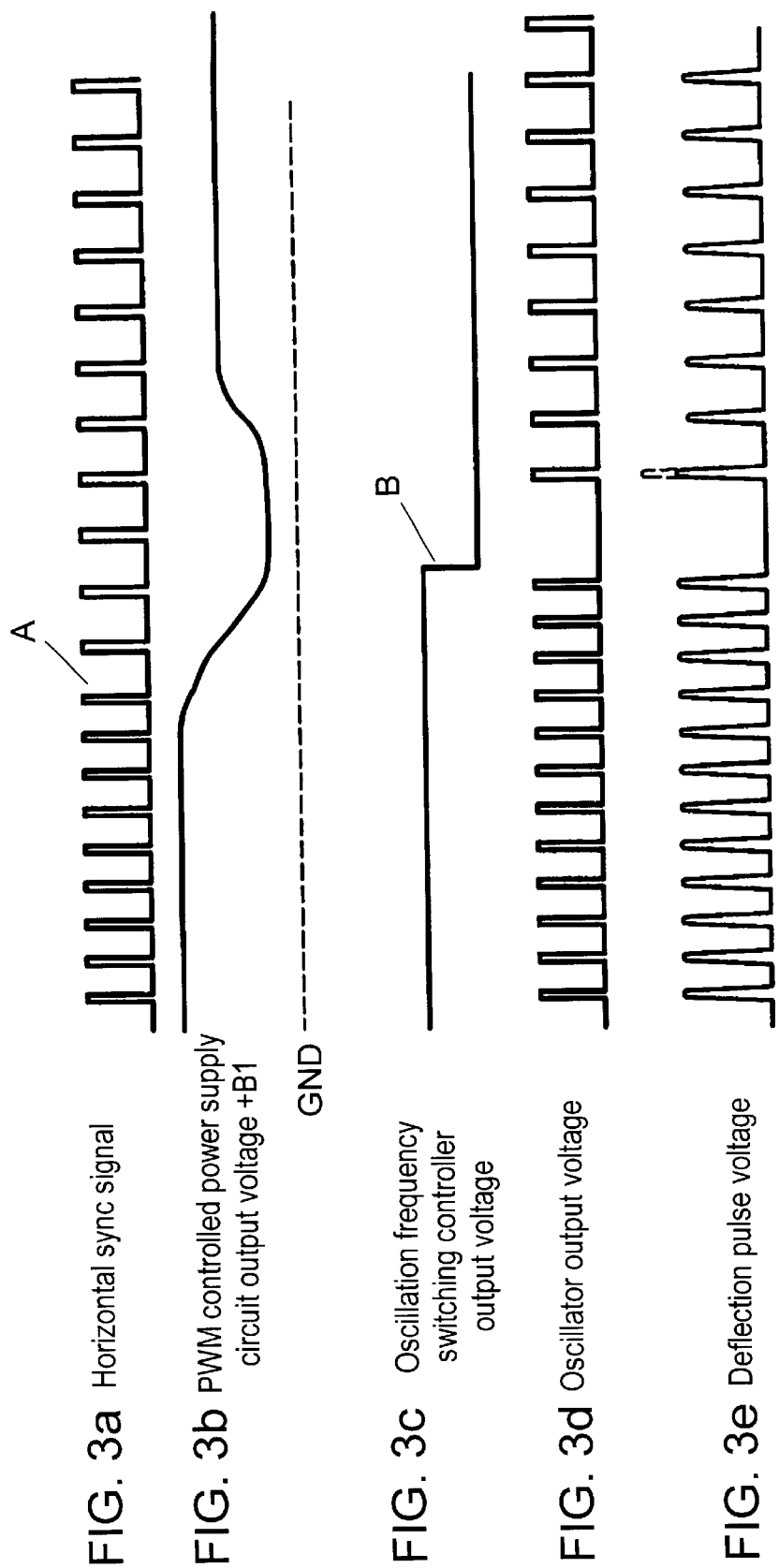

FIG. 6a Horizontal sync signal

FIG. 6f Frequency discriminator output voltage

FIG. 6c Oscillation frequency switching controller output voltage

FIG. 6b PWM controlled power supply circuit output voltage +B1

FIG. 6g Polarity inverter output

FIG. 6e Deflection pulse voltage

FIG. 10a  Horizontal sync signal

FIG. 10b  PWM controlled power supply circuit output voltage +B1

FIG. 10e  Deflection pulse voltage

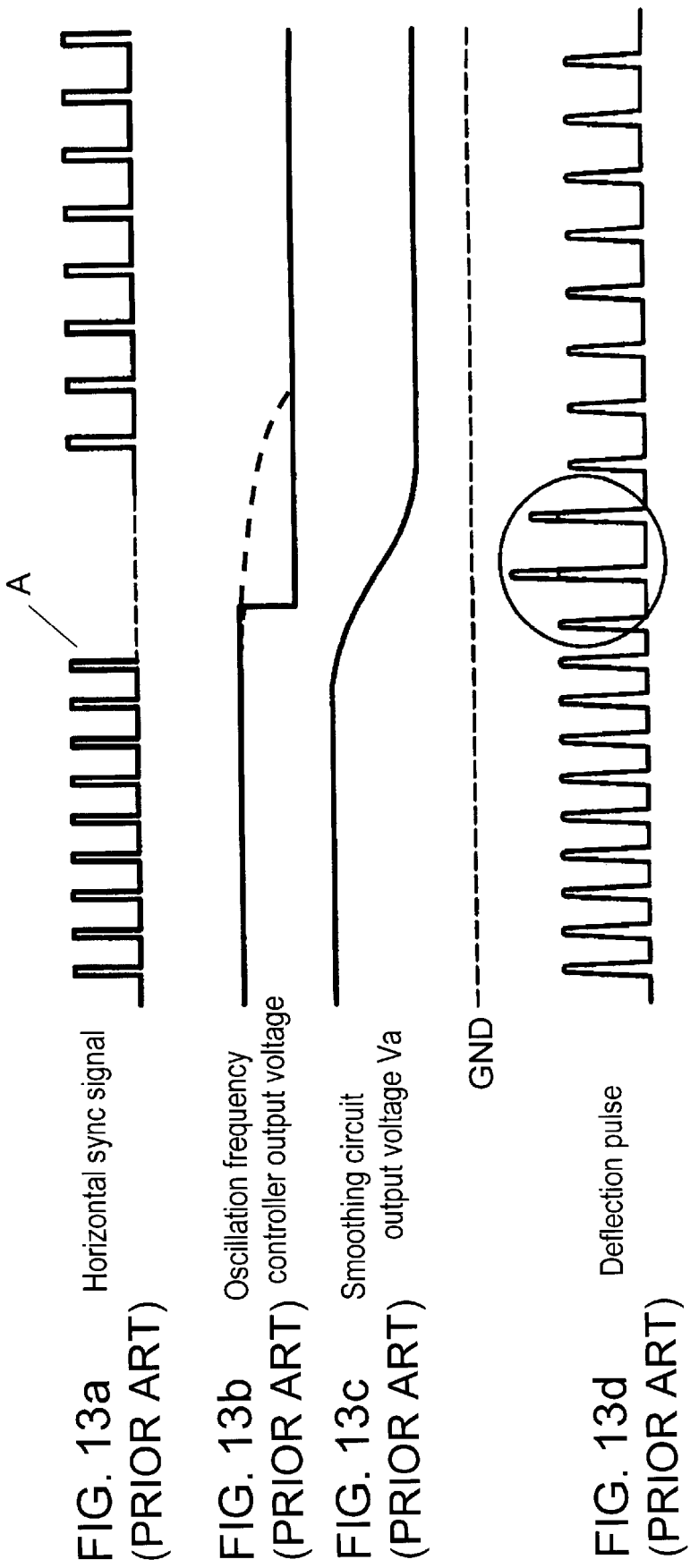
FIG. 13a (PRIOR ART)  Horizontal sync signal
FIG. 13b (PRIOR ART)  Oscillation frequency controller output voltage
FIG. 13c (PRIOR ART)  Smoothing circuit output voltage Va
FIG. 13d (PRIOR ART)  Deflection pulse

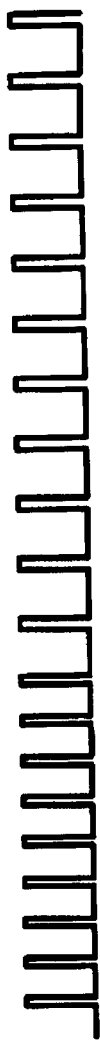
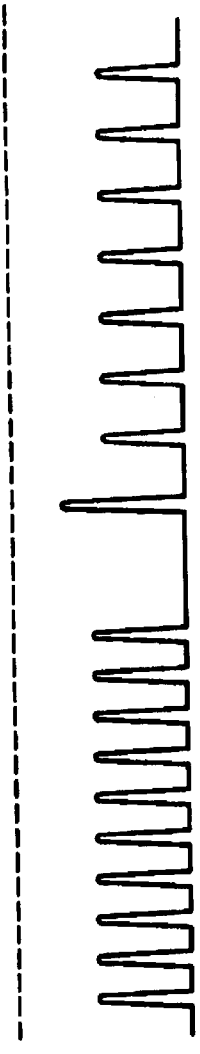
FIG. 14a (PRIOR ART)  Horizontal sync signal
FIG. 14b (PRIOR ART)  Oscillation frequency controller output voltage
FIG. 14e (PRIOR ART)  Oscillator output voltage
FIG. 14c (PRIOR ART)  Smoothing circuit output voltage Va
FIG. 14d (PRIOR ART)  Deflection pulse

DEFLECTION APPARATUS AND CONTROL METHOD THEREOF

FIELD OF THE INVENTION

The present invention relates to a deflection apparatus used in television receivers and others capable of receiving and reproducing television signals of various systems, and a control method thereof. More particularly, it relates to a technology for controlling the deflection frequency and deflection pulse adequately in the transient period of changing from one television system to other system during receiving a signal, and at the time of on/off switching of power source of the receiver.

BACKGROUND OF THE INVENTION

As a conventional deflection apparatus, for example, a configuration disclosed in Japanese Laid-open Patent No. 4-29471 has been proposed.

FIG. 12 is a block diagram of a conventional horizontal deflection apparatus. In FIG. 12, a frequency-to-voltage (F/V) converter 1 is a circuit for issuing a voltage (V) depending on the frequency (F) of an input horizontal synchronizing (sync) signal. A pulse width modulation (PWM) circuit 11 is a circuit for issuing a control pulse synchronized with the input horizontal sync signal, and controlled in pulse width by the output of the F/V converter 1.

A transistor 12 turns on or off the supply voltage (+B) by the control pulse of the PWM circuit 11, and generates and outputs a desired driving pulse voltage. A smoothing circuit 13 supplies a DC voltage Va obtained by smoothing and rectifying the driving pulse voltage as a power source of a horizontal deflection output circuit 4 through a choke coil 5.

The horizontal deflection output circuit 4 has the following configuration.

Between the collector and the emitter of a horizontal output transistor 10, a series circuit of deflection coil 6 and S correction capacitor 7, and a resonance capacitor 8 and a damper diode 9 are connected in parallel. The choke coil 5 is connected to the collector of the transistor 10, and the emitter is connected to the ground.

The operation is described below. In FIG. 12, when the frequency of the input horizontal sync signal (hereinafter called input frequency) is changed, the output voltage of the F/V converter 1 varies. Depending on the output voltage, the pulse width differs in the driving pulse voltage output from the PWM circuit 11. By the change of the pulse width of the driving pulse, the output voltage Va of the smoothing circuit 13 varies. Thus, as the voltage Va input into the horizontal deflection output circuit 4 through the choke coil 5 is controlled depending on the change of the input frequency, the current flowing in the deflection coil 6 becomes constant. As a result, if the input frequency changes, the current is controlled so that the display amplitude may be constant.

In the horizontal deflection circuit used actually, in addition to the above circuit, an oscillator 2 (indicated by bold dotted line in FIG. 12) capable of synchronizing with the horizontal sync signal is connected to the base of the horizontal output transistor 10. When a horizontal sync signal is not input in to the horizontal deflection circuit, the oscillator 2 oscillates freely and a raster is always displayed on the screen. When a horizontal sync signal is input into the horizontal deflection circuit, a synchronized picture is displayed.

The Digital Terrestrial Television Broadcasting in the United States is presented in 18 different systems, and each system significantly differs in the frequency of the horizontal sync signal. That is, the frequency ranges from 12.58 to 45.05 kHz. Accordingly, the oscillator 2 is mostly designed to synchronize by changing over the oscillation frequency depending on the input frequency. This oscillator generates a signal synchronized with the horizontal-sync signal by dividing the oscillation frequency of the oscillator, and it is applicable to various television systems by changing over the frequency dividing ratio.

When the input frequency is changed from a high frequency to a low frequency at point A of the waveform in FIG. 13a, the oscillation frequency is changed over suddenly to the waveform in FIG. 13b according to the changeover signal. On the other hand, the output voltage Va of the smoothing circuit 13 falls slowly as shown in FIG. 13c. The horizontal deflection output circuit is operating at low frequency, but Va still remains high. Therefore the deflection pulse becomes high as indicated by solid-line waveform enclosed by the circular line in FIG. 13d. This pulse is added between the collector and emitter of the w horizontal output transistor. Hence it is necessary to control the oscillation frequency as shown by the dotted line in FIG. 13b.

The oscillation frequency of this oscillator varies discontinuously. Therefore, depending on the timing of changing over the frequency dividing ratio, as shown in FIG. 14e, the output pulses of the oscillator 2 skip one to several periods, and the oscillation frequency is low temporarily. If the output voltage Va of the smoothing circuit 13 is at a voltage for obtaining a specified horizontal amplitude at its input frequency as shown in FIG. 14c, the oscillation frequency is lower than the input frequency, and hence the collector pulse voltage generated in the horizontal output transistor 10 is high.

Further, when the power source is cut off at the time of high input frequency, i) the power source may be turned on until the output voltage of the smoothing circuit is not sufficiently lowered, or ii) a high voltage may be applied to the horizontal output transistor when the oscillation frequency elevates at low input frequency.

It is hence necessary to use a horizontal output transistor with the higher maximum collector voltage.

Meanwhile, after the input frequency is changed over, the input frequency is discriminated, and while the oscillation frequency is changed over to be equal to the input frequency, the input frequency and the oscillation frequency of the oscillator are different. Therefore, it may take a certain time until the display is stabilized.

SUMMARY OF THE INVENTION

It is an object of the invention to present a deflection apparatus and a control method thereof capable of changing over and controlling in a stable condition, without requiring a high voltage transistor, even if using an oscillator for changing over the oscillation frequency discontinuously depending on the input frequency.

It is another object of the invention to present a deflection apparatus capable of changing over and controlling in a stable condition, even if turning on or off the power source continuously.

It is a further object of the invention to present a deflection apparatus and a control method thereof capable of changing over and controlling smoothly until the input frequency is changed over and the oscillation frequency of the horizontal oscillator is changed over to an optimum frequency.

To achieve the objects, the deflection apparatus of the invention is mainly composed of the following elements.

a) A PWM controlled power supply circuit generates a necessary supply voltage for obtaining a desired horizontal amplitude synchronized with a horizontal sync signal. b) A PWM voltage controller discriminates the frequency of the horizontal sync signal, and controls the output voltage of the PWM controlled power supply circuit. c) An oscillation frequency switching controller discriminates the frequency of the horizontal sync signal, and outputs a frequency changeover voltage to the oscillator so that the oscillation frequency may be optimum for obtaining a specified horizontal amplitude in synchronism with the output voltage of the PWM controlled power supply circuit. d) The oscillator is synchronized with the horizontal sync signal, and outputs a horizontal oscillation pulse at the frequency controlled by the output of the oscillation frequency switching controller. e) The horizontal deflection output circuit is synchronized with the horizontal oscillation pulse, and generates a deflection current for deflecting the electron beam in the horizontal direction.

In this deflection apparatus, for example, when the input frequency is changed from high frequency to low frequency, after detecting the minimum value of the output voltage of the PWM controlled power supply circuit, the oscillation frequency is controlled so as to be an frequency equal to the input frequency. Then the PWM controlled supply voltage is controlled so as to be an optimum voltage for obtaining a specified horizontal amplitude at this input frequency. Accordingly, as the oscillator, by using the oscillator of the type of changing over and controlling the oscillation frequency discontinuously, a high voltage pulse is not generated in the horizontal deflection circuit in the process of changing over the frequency.

Further, assume a case that the oscillation frequency is changed over at a certain changeover point, and then one of the pulses output from the oscillator is missing. Then the horizontal deflection output circuit is driven at a frequency lower than the original frequency. Then the changing over is made at the point where the output voltage of the PWM controlled power supply circuit is at minimum. Therefore high voltage pulse is not generated in the horizontal output circuit even if the oscillation frequency becomes low in the process of changing over the frequency.

Therefore, the horizontal deflection output circuit operates in a stable condition without a high voltage transistor.

BRIEF DESCRIPTION OF THE DRAWINGS

FIGS. 2(a–e) is an operation waveform diagram of changing over from high frequency to low frequency in FIG. 1.

FIGS. 3(a–e) is an operation waveform diagram of skipping one pulse in output pulses of oscillator, by changing over from high frequency to low frequency in FIG. 1.

FIGS. 13(a–d) is an operation waveform diagram of the conventional deflection apparatus.

FIGS. 14(a–e) is other operation waveform diagram of the conventional deflection apparatus.

DESCRIPTION OF THE PREFERRED EMBODIMENTS

Figure 1:
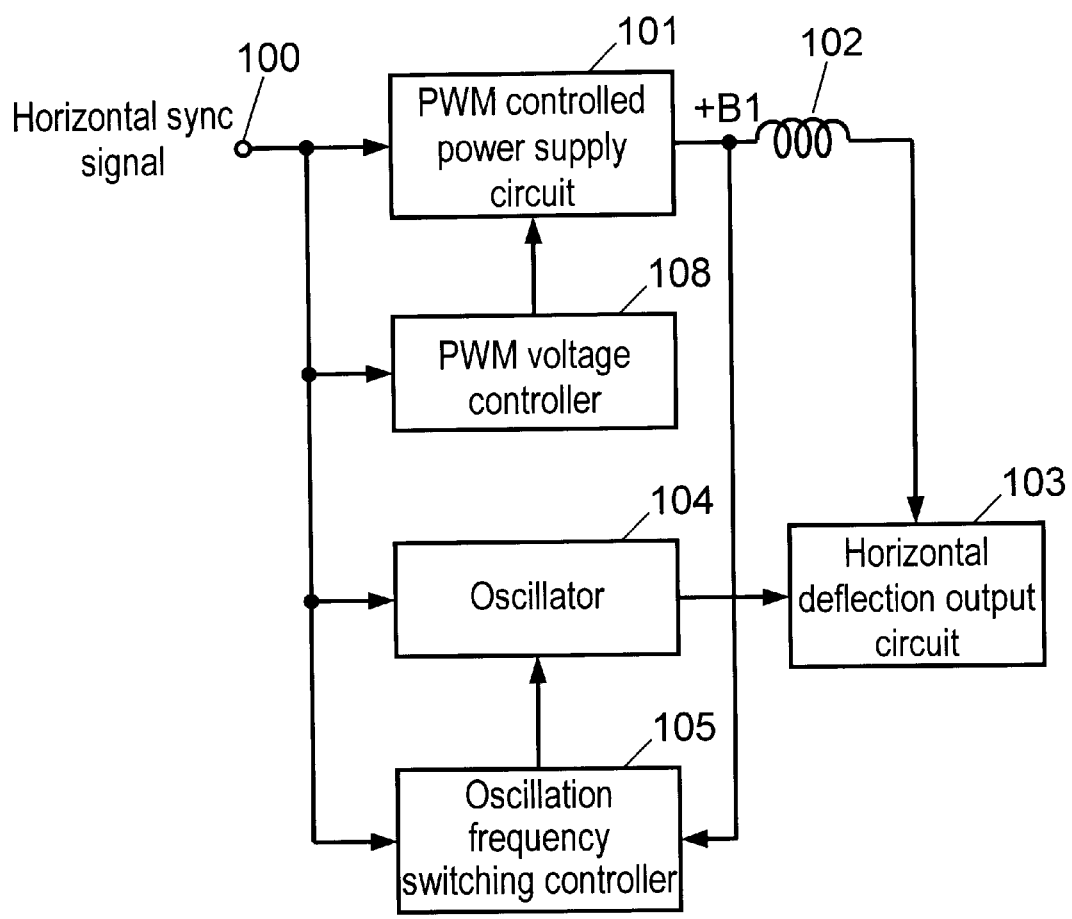
FIG. 1 is a block diagram of a deflection apparatus in embodiment 1 of the invention.

Referring now to the drawings, a deflection apparatus of the invention according to embodiment 1 is described below.

Embodiment 1

In FIG. 1, a PWM controlled power supply circuit 101 has a function of generating a driving pulse voltage synchronized with the horizontal sync signal supplied in an input terminal 100, and a function of rectifying it and converting into a DC voltage +B1, and this DC voltage is fed as a supply voltage to the horizontal deflection output circuit 103 through a choke coil 102. When the output voltage of a PWM voltage controller 108 is supplied, the pulse width of driving pulse is controlled depending on the magnitude of this voltage. Accordingly, if the frequency of the horizontal sync signal fed into the input terminal 100 (hereinafter called input frequency) is changed, the horizontal amplitude is controlled constantly.

A oscillator 104 outputs a horizontal oscillation pulse synchronized with each horizontal sync signal depending on the changeover voltage output from an oscillation frequency switching controller 105.

Figure 12:
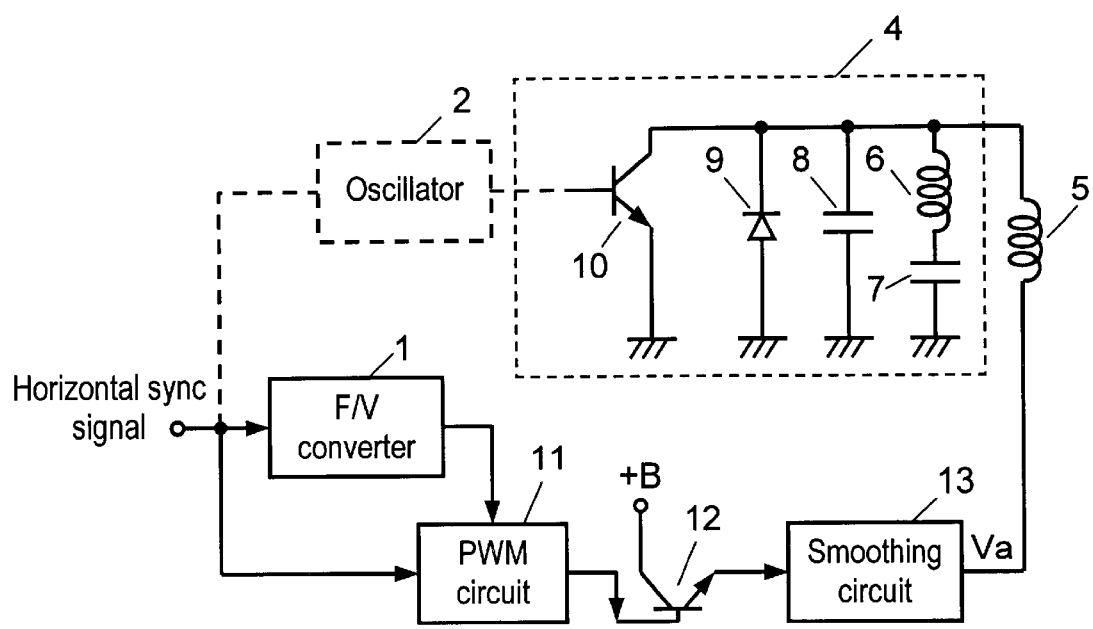
FIG. 12 is a block diagram of a conventional deflection apparatus.

The horizontal deflection output circuit 103 has a same function as the horizontal deflection output circuit in FIG. 12, and it generates a saw tooth current for deflecting the electron beam in the horizontal direction from the horizontal oscillation pulse output from the oscillator 104.

The PWM voltage controller 108 recognizes the input frequency, and outputs a voltage for controlling the output voltage of the PWM controlled power supply circuit 101.

The oscillation frequency switching controller 105 discriminates the input frequency and the lowest voltage of the output voltage of the PWM controlled power supply circuit 101, and then outputs a voltage for changing over the horizontal oscillation frequency of the oscillator 104.

FIG. 2 shows operation waveforms of the parts when the input frequency is changed from high frequency to low frequency, and its shows the changeover timing of the oscillator 104 and PWM controlled power supply circuit 108.

FIG. 2a shows a waveform of horizontal sync signal, telling that the input frequency is changed over at point A.

FIG. 2b shows an output voltage waveform of the PWM controlled power supply circuit 101. This output voltage +B1 once changes to a low voltage as shown in the diagram when the input frequency is changed over, and then changes to an optimum voltage for obtaining a specified horizontal amplitude at its input frequency.

FIG. 2c shows a voltage waveform output from the oscillation frequency switching controller 105. The switching controller 105 detects the changeover point of the input frequency and the lowest voltage point of the output voltage of the PWM controlled power supply circuit, and outputs a changeover voltage for changing over the horizontal oscillation pulse.

FIG. 2d shows a horizontal oscillation pulse output from the oscillator 104. The oscillation frequency is changed over by the output voltage from the oscillation frequency switching controller 105.

FIG. 2e shows a deflection pulse waveform output from the horizontal deflection output circuit 101. Its output voltage has the same at the frequency as the oscillation frequency of the oscillator 104, and is proportional to the output voltage +B1 of the PWM controlled power supply circuit 101.

FIG. 3 shows operation waveforms of circuits when the input frequency is changed from a high frequency to a low frequency in the configuration in FIG. 1, relating to the timing of the horizontal oscillation pulse output from the oscillator, skipping one pulse in the input frequency.

FIG. 3a shows a waveform of horizontal sync signal, telling that the input frequency is changed over at point A.

FIG. 3b shows an output voltage waveform of the PWM controlled power supply circuit 101. This output voltage +B1 once changes to a low voltage when the input frequency is changed over, and then changes to an optimum voltage for obtaining a specified horizontal amplitude at its input frequency.

FIG. 3c shows a voltage waveform output from the oscillation frequency switching controller 105. The switching controller 105 detects the changeover point of the input frequency and the lowest voltage point of the output voltage of the PWM controlled power supply circuit, and outputs a changeover voltage for changing over the oscillation frequency of the oscillator 104. Herein, the lowest voltage can be detected by observing the output voltage of the PWM controlled power supply circuit at specific time intervals by the computer. Alternatively, the point of the output voltage of the PWM controlled power supply circuit becoming lower than the predetermined voltage may be detected.

FIG. 3d shows a horizontal oscillation pulse output from the oscillator 104. The oscillation frequency is changed over by the output voltage from the oscillation frequency switching controller 105.

FIG. 3e shows a deflection pulse waveform output from the horizontal Hi deflection output circuit 103. Its output voltage is same in the period as the horizontal oscillation pulse output by the oscillator 104, and is proportional to the output voltage +B1 of the PWM controlled power supply circuit 101.

The operation of the deflection apparatus in embodiment 1 is described below.

First, when the input frequency is changed from high frequency to low frequency, by the control voltage output from the PWM voltage controller 108, the output voltage of the PWM controlled power supply circuit 101 gradually changes toward the minimum voltage as shown in FIG. 2b. As a result, the deflection pulse output from the horizontal deflection output circuit 103 also changes to a low pulse voltage as shown in FIG. 2e.

The oscillation frequency switching controller 105 discriminates the input frequency and the minimum voltage of the output voltage of the PWM controlled power supply circuit 101, and outputs a changeover voltage so that the frequency of the horizontal oscillation pulse output from the oscillator 104 may be equal in frequency to the input frequency. As a result, the horizontal oscillation pulse output from the oscillator 104 is equal to the input frequency. The deflection pulse of the horizontal deflection output circuit 103 driven by his pulse changes, as shown in FIG. 2e, from a low pulse voltage to an optimum pulse voltage for obtaining a specified display amplitude at this input frequency.

At point A in FIG. 3a, the input frequency is changed from a high frequency to a low frequency, and when the oscillation frequency switching controller 105 is changed over at point B in FIG. 3c, one pulse of the pulses output from the oscillator 104 skips as shown in FIG. 3d, and the frequency may be considerably lower than the original frequency. In this case, too, the minimum voltage of the +B1 waveform shown in FIG. 3b is detected, and the changeover pulse of the oscillation frequency switching controller 105 changes over the oscillator 104. Therefore, the deflection pulse output from the horizontal deflection output circuit 103 does not become a high pulse voltage as shown in FIG. 3e.

Thus, according to embodiment 1, when the input frequency is changed from high frequency to low frequency, i) the PWM voltage controller sets the output voltage +B1 of the PWM controlled power supply circuit at the minimum voltage, ii) the oscillation frequency switching controller detects this voltage, and then controls the oscillator so as to be equal in frequency to the input frequency, and iii) the PWM voltage controller sets the output voltage of the PWM controlled power supply circuit at an optimum voltage for obtaining a specified horizontal amplitude at its input frequency. Therefore, by using the oscillator of the type of controlling by changing over the oscillation frequency discontinuously, in the process of changing over the frequency, the height of the voltage pulse generated in the horizontal deflection output circuit can be kept below a specified height. Thus, the horizontal deflection output circuit operates in a stable condition.

Further, when changing over the oscillation frequency at a certain changeover point, if one pulse skips out of the pulses output from the oscillator and the horizontal deflection output circuit is driven at a lower frequency than the original frequency, it is designed to change over at the moment when the output voltage +B1 of the PWM controlled power supply circuit becomes lower than the optimum voltage for obtaining the specified horizontal amplitude. Therefore, if the oscillation frequency is lowered in the process of changing over the frequency, the height of the voltage pulse generated in the horizontal output circuit may kept lower than the specified height. As a result, the horizontal deflection output circuit can operate in a stable condition without particularly using a high voltage transistor.

Figure 4:
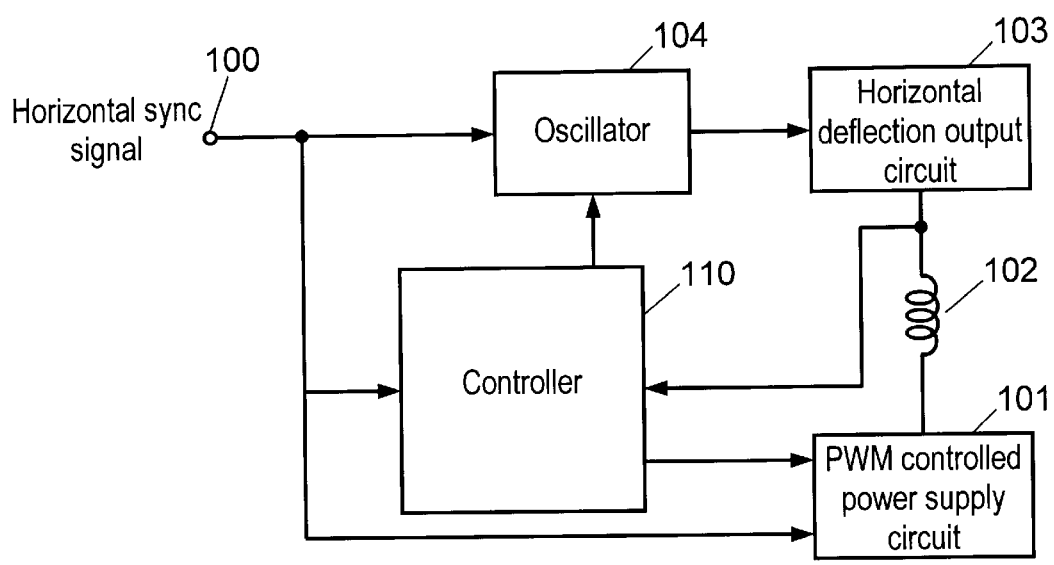
FIG. 4 is a block diagram of other deflection apparatus in embodiment 1 of the invention.

In the embodiment, i) the PWM controlled power supply circuit, ii) the oscillator, and iii) the horizontal output circuit are controlled by the constituent elements as explained above. The same effects are also obtained by controlling i), ii) and iii) in the procedure as explained above. For example, in the configuration shown in FIG. 4, a controller 110 may execute the same procedure.

Embodiment 2

Embodiment 2 of the invention is described below while referring to FIG. 5.

Figure 5:
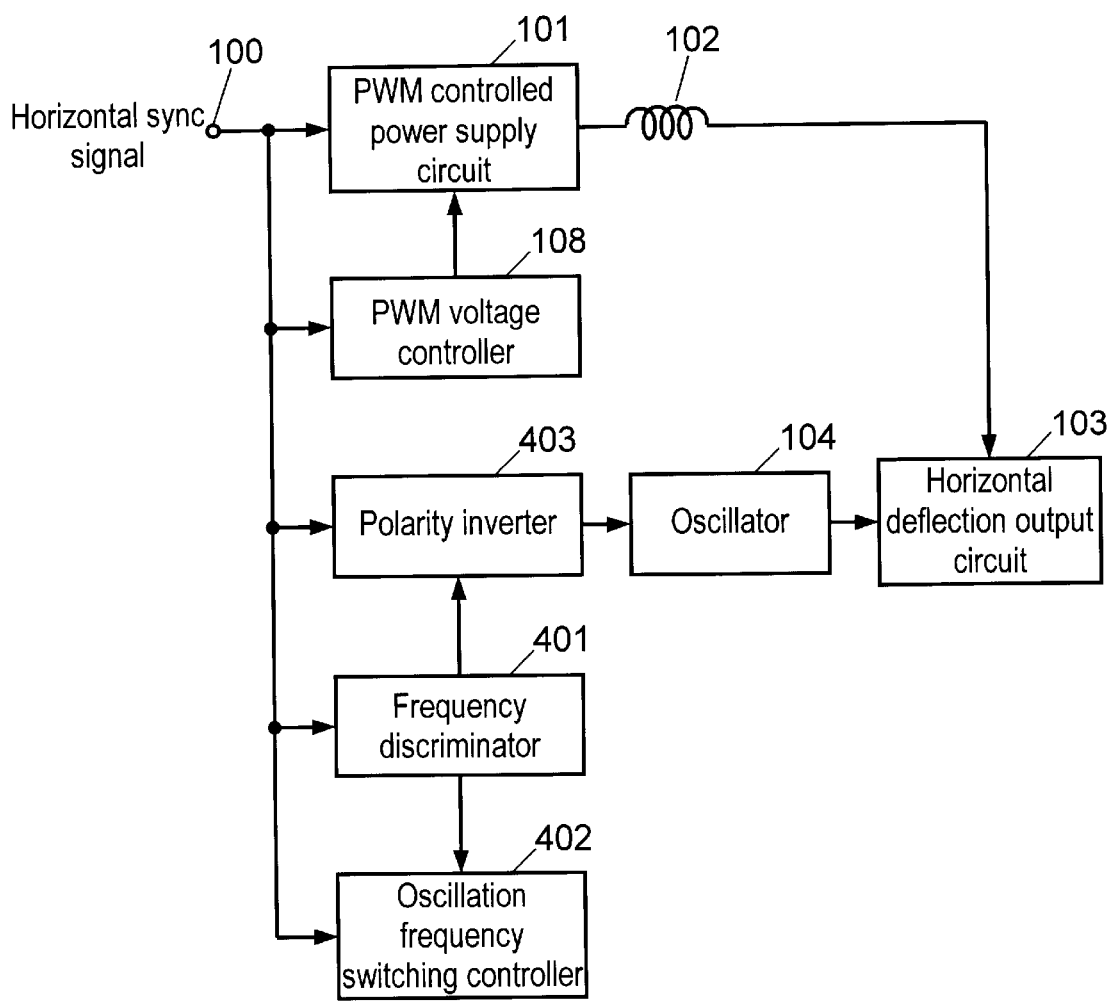
FIG. 5 is a block diagram of a deflection apparatus in embodiment 2 of the invention.

In FIG. 5, the same parts as in embodiment 1 are identified with same reference numerals, and their description is omitted.

In FIG. 5, a frequency discriminator 401 is a circuit for detecting change of input frequency, and issuing a changeover signal for inverting the polarity of horizontal sync signal to a polarity inverter 403.

The polarity inverter 403 is a circuit for inverting the polarity of the sync pulse to be output to the oscillator 104 by the changeover signal of the frequency discriminator 401.

An oscillation frequency switching controller 402 receives a changeover signal from the frequency discriminator 401, and, after a specified time, outputs a changeover voltage for changing over the oscillation frequency of the oscillator 104.

Figure 6:
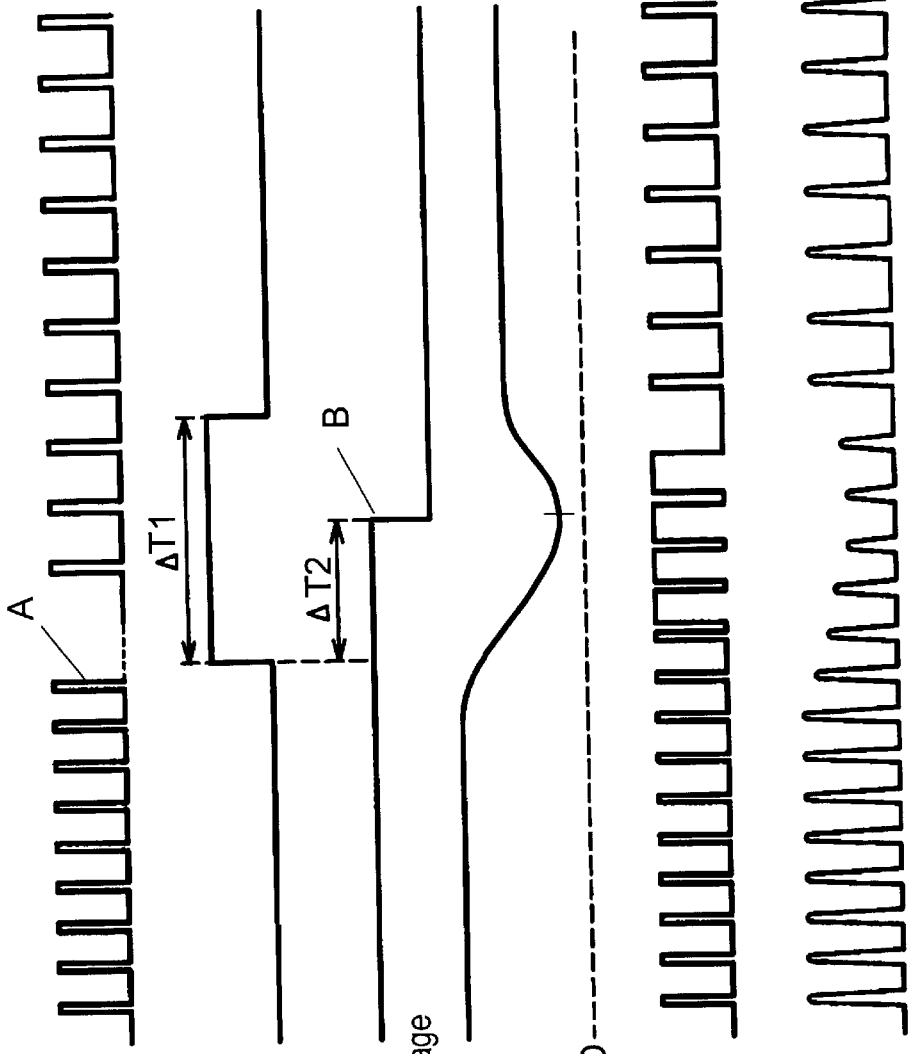
FIG. 6(a–c, e–g) is an operation waveform diagram of changing over from high frequency to low frequency in FIG. 5.

FIG. 6 shows operation waveforms of circuits when the input frequency is changed over from high frequency to low frequency, in the configuration in FIG. 5, relating to the timing of the output voltage of the frequency discriminator 401, output voltage of PWM controlled power supply circuit and changeover voltage of oscillation frequency. In FIG. 6, same parts as in FIG. 2 are identified with same reference numerals, and their description is omitted.

FIG. 6f is a waveform of changeover voltage output from the frequency discriminator 401. It shows the voltage for inverting the polarity of the sync pulse output from the polarity inverter 403.

FIG. 6g shows a waveform of output voltage output from the polarity inverter 403, in which by the changeover voltage synchronized with the horizontal sync signal and output from the frequency discriminator 401, the pulse inverted in polarity from the horizontal sync pulse is output.

The operation is explained below.

First, when the input frequency is changed at point A in FIG. 6a, the frequency discriminator 401 detects the change of input frequency, and outputs a changeover voltage to the polarity inverter 403. The changeover voltage is at "High" during a time duration of ΔT1 as shown in FIG. 6f.

The polarity inverter 403 outputs a sync pulse inverted in polarity as shown in FIG. 6g, by the changeover voltage of the frequency discriminator 401. As a result, for example, supposing the oscillator 104 to be a circuit synchronized only with a pulse of negative polarity, when the pulse output from the polarity converter 401 is changed to positive polarity as shown in FIG. 6g, it is not synchronized, but oscillates freely at the frequency of the changeover voltage controlled in the oscillation frequency switching controller 402.

The oscillation frequency switching controller 402 discriminates the input frequency of horizontal sync signal, and after delaying by a time duration of ΔT2 from the changeover voltage output from the frequency discriminator 401 shown in FIG. 6f, it outputs the changeover voltage so that the oscillation frequency oscillated by the oscillator 104 may be equal to the input frequency as shown in FIG. 6c. Later, the changeover voltage output from the frequency discriminator 401 returns to Low, and the sync pulse output from the polarity inverter 403 is changed over to the pulse of negative polarity to be synchronized with the oscillator 104. Accordingly, for a certain period after changeover of the oscillation frequency, the synchronism is not disturbed if the oscillation frequency of the oscillator 104 is different from the input frequency. Therefore, the circuit 103 operates in a stable condition. FIG. 6b shows the output voltage waveform of the PWM controlled power supply circuit 101 during this operation.

Thus, when the input frequency is changed over from a high frequency to a low frequency, the polarity of the sync signal input in the oscillator is inverted, and while the deflection frequency of the deflection apparatus is changed over, the oscillator is kept in free oscillation state. Therefore, in the changeover period in which the horizontal sync signal and the oscillation frequency are different, it is free from disturbance of synchronism of the oscillation pulse synchronized or not synchronized with the input sync signal.

Figure 7:
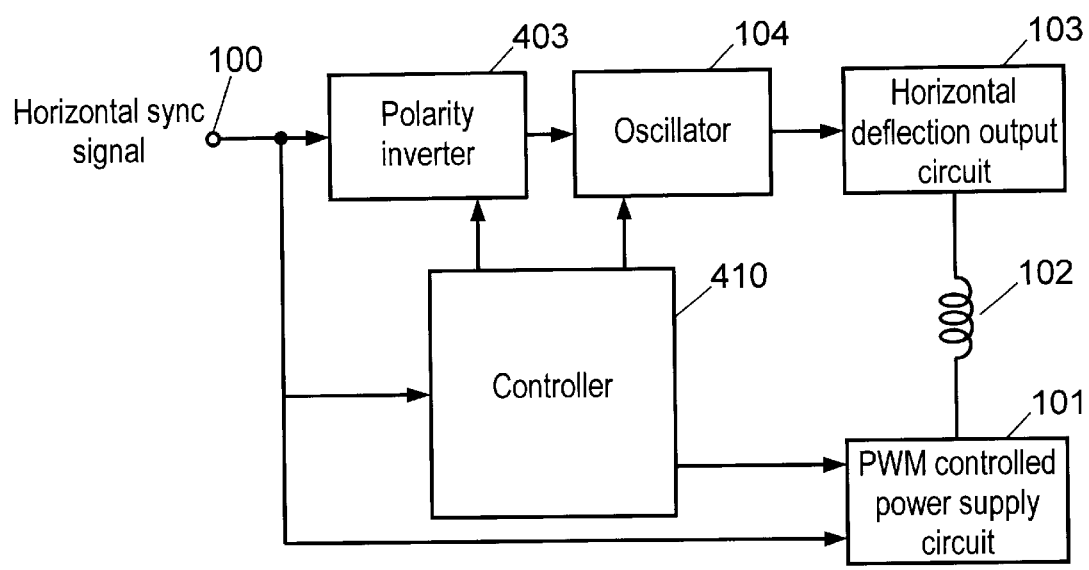
FIG. 7 is a block diagram of other deflection apparatus in embodiment 2 of the invention.

In this embodiment, i) the polarity inverter, ii) the PWM controlled power supply circuit, iii) the oscillator, and iv) the horizontal output circuit are controlled by the constituent elements as described above. The same effects are obtained by controlling i), ii), iii), and iv) in the procedure explained above. For example, in the configuration shown in FIG. 7, the controller 410 may execute the above procedure.

Embodiment 3

Figure 8:
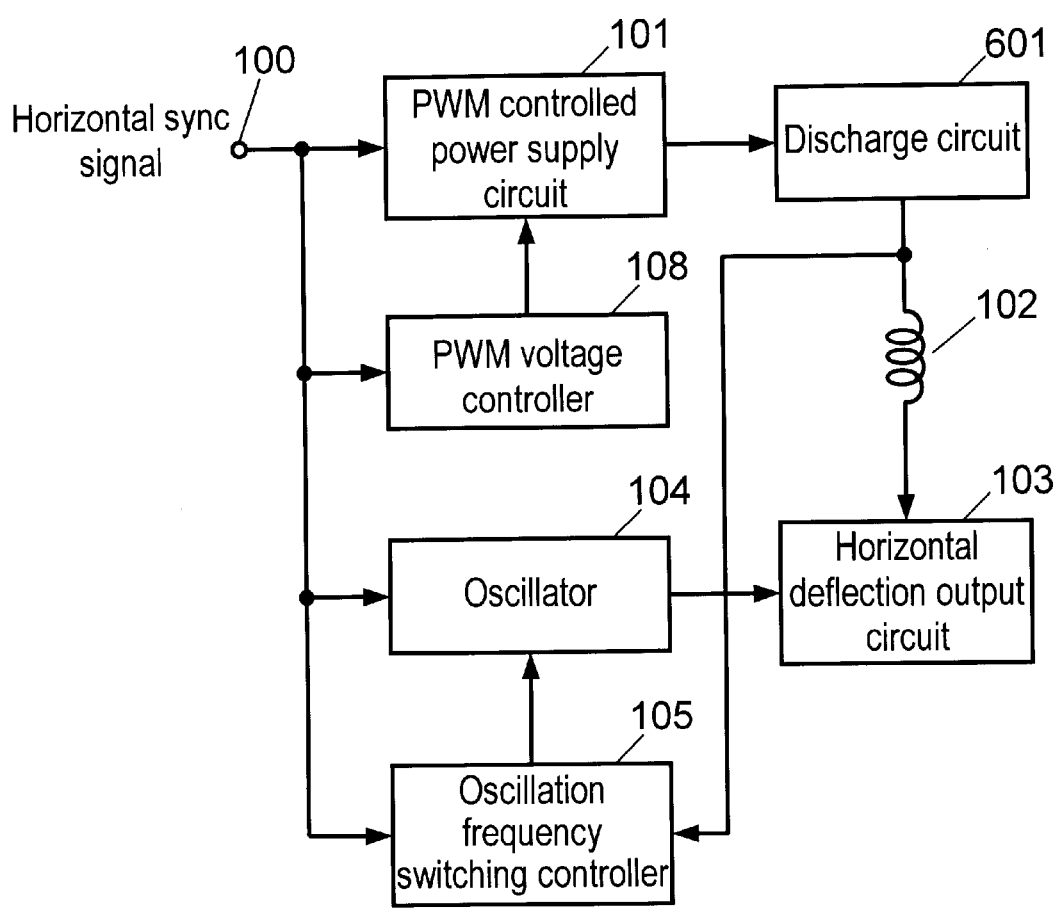
FIG. 8 is a block diagram of a deflection apparatus in embodiment 3 of the invention.

Embodiment 3 of the invention is described below while referring to FIG. 8. In FIG. 8, the same parts as in embodiment 1 shown in FIG. 1 are identified with same reference numerals, and their description is omitted.

In FIG. 8, a discharge circuit 601 quickly discharges the supply voltage fed into the horizontal deflection output circuit 103 through the choke coil 102 when the power source of the receiver is turned off, and is lowered to the ground (GND) potential (earth potential).

Figure 9:
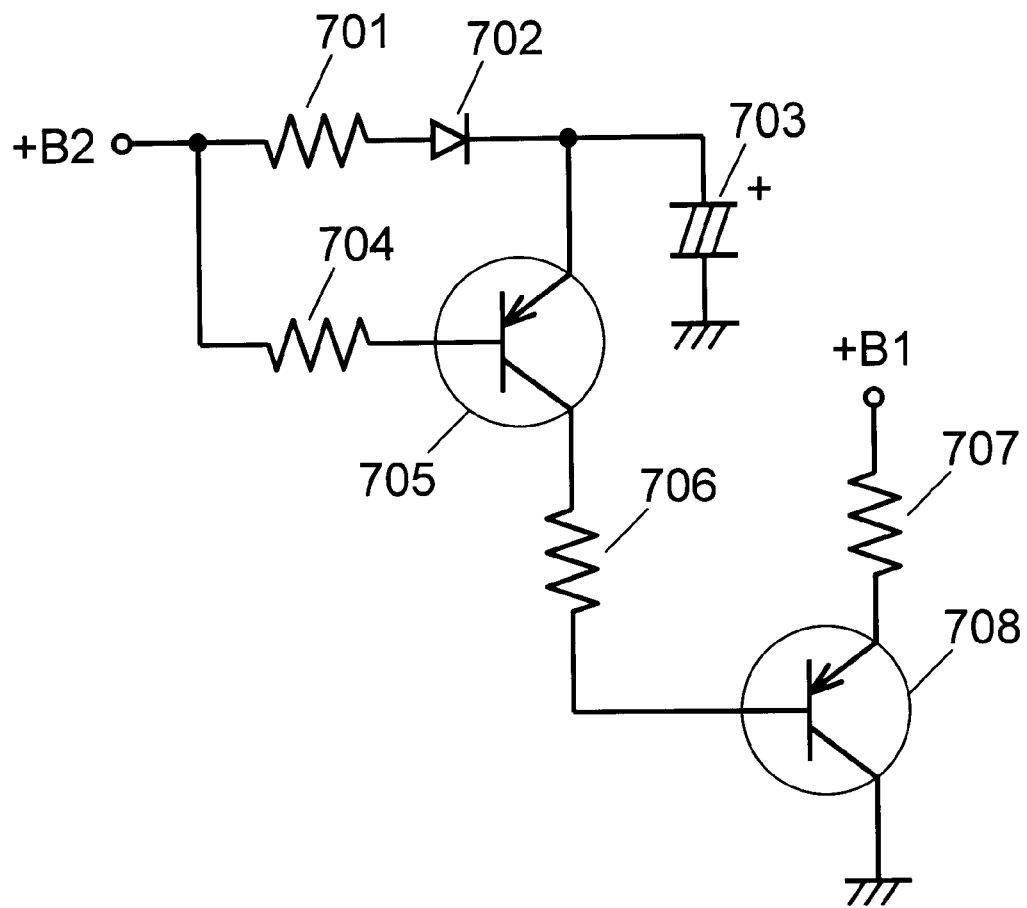
FIG. 9 is an example of embodiment of discharge circuit in FIG. 8.

FIG. 9 is a specific circuit of the discharge circuit 601. In FIG. 9, +B1 is the output voltage of the PWM controlled power supply circuit. Further, +B2 is one of the supply voltages of the receiver, and is a voltage used as the supply voltage for the power source of the oscillator 104 or oscillation frequency witching controller 105, and it is a low voltage, for example, 12 V.

A diode 702 is used for the following purposes.

i) When the potential of +B2 is high, a capacitor 703 is charged from +B2 through a resistor 701 and its diode 702.

ii) When the power source of the receiver is turned off, the potential of +B2 suddenly drops. At this time, the diode 702 prevents discharge of the charge of the electrolytic capacitor 703.

A transistor 705 detects the difference between the potential of +B2 and the potential of the capacitor 703 through a resistor 704, and transmits it to a transistor 708 through a resistor 706. The transistor 708 is a high power transistor. When the power source of the receiver is turned off, the transistor 708 is turned on by the output current of the transistor 705, and the supply voltage fed into the horizontal deflection output circuit 103 is quickly discharged through a power resistor 707 to return to the GND potential.

Figure 10:
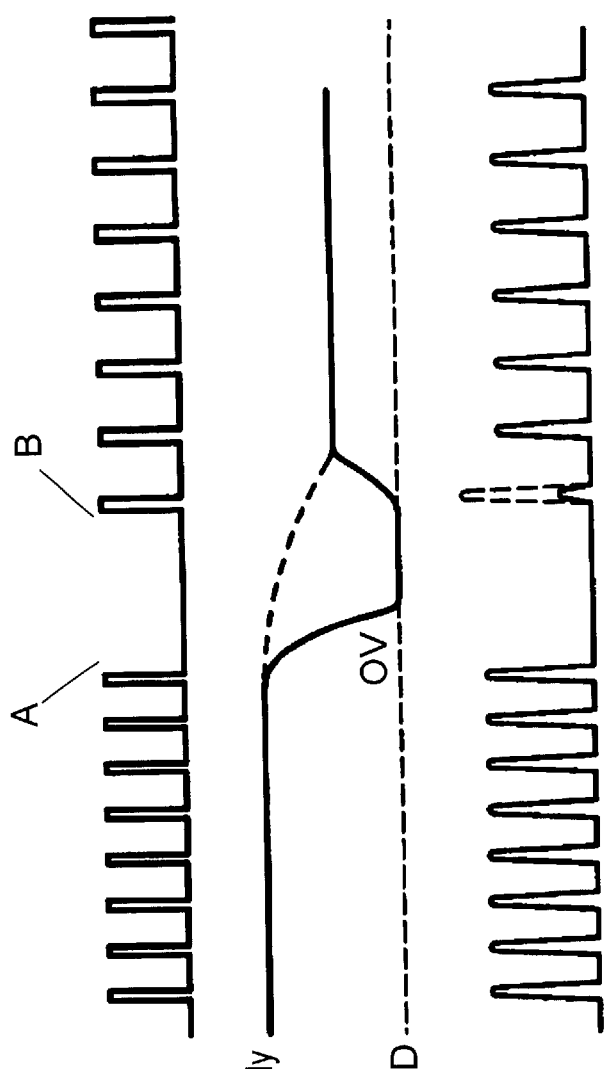
FIGS. 10(a,b,e) is an operation waveform diagram by continuous on/off switching of power source in FIG. 8.

FIG. 10 shows the timing of the output voltage and deflecting pulse of the PWM controlled power supply circuit when turning on or off the power source.

FIG. 10a shows a horizontal sync signal. At the timing of point A of the horizontal sync signal waveform, the power source of the receiver is turned off, and the power source is turned on at the timing of point B.

FIG. 10b shows a waveform of output voltage of the horizontal deflection output circuit 103 supplied from the PWM controlled power supply circuit 101.

FIG. 10e shows a waveform of deflection pulse voltage generated in the horizontal deflection output circuit 103 by the voltage supplied from the PWM controlled power supply circuit 101.

The operation is described below.

In FIG. 10a, when the power source of the receiver is turned off at the timing of point "A" at the high input frequency, the deflection pulse is stopped and the load of the power supply circuit 101 decreases. Then the voltage "+B1" supplied from the PWM controlled power supply circuit 101 into the horizontal deflection output circuit 103 declines slowly as indicated by dotted line of waveform (b) in FIG. 10.

The deflection pulse is at high voltage as indicated by dotted line in FIG. 10e in the following case.

Assume the power source of the receiver is turned on at the timing of point "B". Then the voltage at "B" is still high, because the output voltage of the power supply circuit 101 is not discharged completely. Further assume, at that time, the input frequency is changed to a lower frequency than at the time of being turned off, or the oscillation is started at low frequency of output of the oscillator 104.

In FIG. 8, in order to prevent a generation of the high pulse above mentioned, a discharge circuit 601 is inserted between the output of the PWM controlled power supply circuit 101 and the choke coil 102. The discharge circuit 601 discharges quickly the voltage of the power supply circuit 101 to set the voltage the GND potential, when the power source of the receiver is turned off.

The operation of the discharge circuit 601 is described below.

In FIG. 9, while the receiver is operating, an electrolytic capacitor 703 is charged at the voltage +B2. When the power source of the receiver is turned off at the timing of point A in FIG. 10a, the voltage of +B2 drops. However, since current does not flow in the direction of +B2 from the voltage source charged in the electrolytic capacitor 703 by a diode 702, a potential difference occurs between the base and emitter of a transistor 705, so that the transistor 705 is turned on. As the transistor 705 is turned on, a potential difference occurs between the base and emitter of a transistor 708, so that the transistor 708 is turned on. As a result, the collector of the transistor 708 becomes the GND potential, and the voltage in the power supply circuit 101 is suddenly discharged through a power resistor 707, so as to be in a state as indicated by solid line in FIG. 10b.

When the power source of the receiver is turned on again at point B in FIG. 10a, the voltage of the PWM output circuit 101 is at the GND potential as shown in FIG. 10b. Therefore, when the power source of the set is turned on again, if the input frequency is low, or if the oscillation frequency of the oscillator 104 rises low, deflection pulse as indicated by dotted line in FIG. 10c is not generated. Instead, as shown in solid line in FIG. 10e, the deflection pulse rises, and if the power source of the receiver is turned on and off continuously, the deflection apparatus operates in a stable condition.

In the power resistor 707 used in discharge, an electric power of about 10 W is applied temporarily. However, since this time is very short, a resistor of about 1 to 3 W can be used.

In this way, when the power source of the receiver is turned off, the output voltage of the PWM controlled power supply circuit is discharged promptly. Therefore, i) if the power source of the receiver is turned on and off continuously, and the input frequency is changed to low frequency, or ii) if the oscillation frequency output from the oscillator oscillates temporarily at low frequency when the power source is turned on although the input frequency is not changed, the output voltage of the PWM controlled power supply circuit is lowered to the GND potential. Accordingly, without generating high voltage in the horizontal deflection output circuit, the horizontal deflection circuit operates in a stable condition.

Embodiment 4

Figure 11:
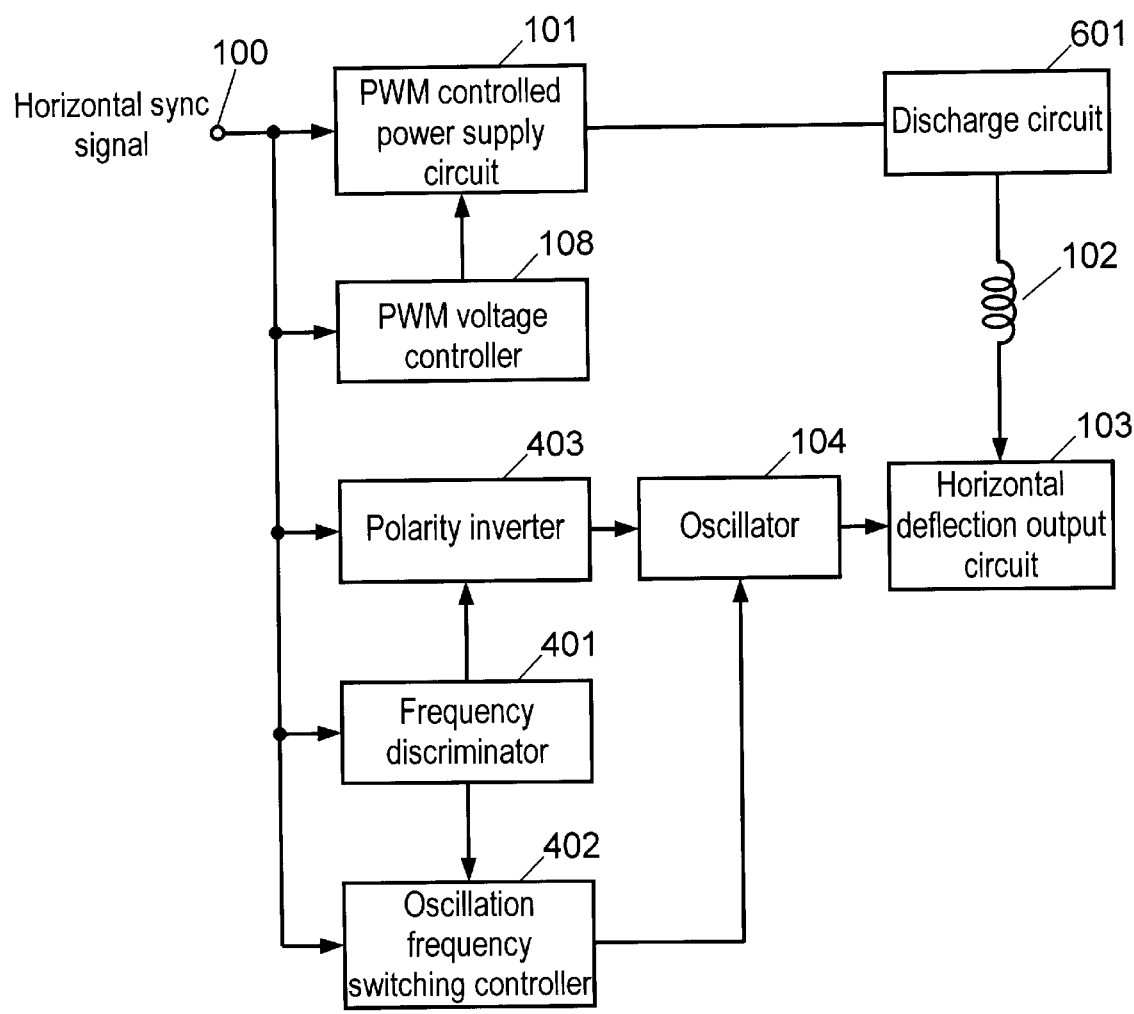
FIG. 11 is a block diagram of a deflection apparatus in embodiment 4 of the invention.

In FIG. 11, the same parts as in embodiment 2 shown in FIG. 5 are identified with same reference numerals and their description is omitted.

In FIG. 11, a discharge circuit 601 quickly discharges the supply voltage fed into the horizontal deflection output circuit 103 through the choke coil 102 when the power source of the receiver is turned off, and sets to the GND potential. The other operation and effects are same as explained in embodiment 3.

In embodiments 1, 2, 3 and 4, it is explained that a high frequency is changed to a low frequency. To the contrary, if changed from a low frequency to a high frequency, by controlling similarly, it is possible to change over in a stable condition.

Embodiment 2 relates to a case of using the oscillator applicable only to the negative polarity. The same principle is applicable to the case of the positive polarity. In this case, by using the negative polarity as the synchronizing polarity when changing over the frequency, it is possible for the oscillator to oscillate freely.

The horizontal deflection circuit is explained in embodiments 1, 2, 3 and 4. In a high voltage output circuit, by controlling similarly, a stable changeover control is possible.

Further, by combining embodiments 1, 2, 3 and 4, further stable changeover control is realized.

As clear from the explanation herein, the invention is intended to keep the height of deflection pulse generated in the horizontal deflection output circuit in an ordinary voltage range, by changing over the oscillation frequency of the oscillator for driving the horizontal deflection output circuit and controlling the output voltage of the PWM controlled power supply circuit at optimum timing.

Moreover, by free oscillation of the oscillator by inverting the polarity of the pulses to be fed into the oscillator at the time of changeover, the voltage of the deflection pulse is kept within an ordinary voltage range if the driving frequency of the horizontal deflection output circuit is disturbed.

Further, by discharging promptly the output voltage of the PWM controlled power supply circuit when turning off the power source, if the power source is turned on and off continuously, the voltage of the deflection pulse is kept within an ordinary voltage range, so that stable changeover control is realized.

What is claimed is:

1. A deflection apparatus comprising:

a) a pulse width modulation (PWM controlled power supply circuit for generating a supply voltage for obtaining a desired horizontal amplitude responsive to an input pulse synchronized with a horizontal synchronizing signal, b) a PWM voltage controller for discriminating a frequency of said horizontal synchronizing signal, and controlling an output voltage of said PWM controlled power supply circuit responsive to the frequency, c) an oscillator for outputting a horizontal oscillation pulse synchronized with said horizontal synchronizing signal, d) an oscillation frequency switching controller for outputting a frequency changeover signal to said oscillator in order to change over the frequency of said horizontal pulse responsive to a change of the output Voltage of said PWM controlled power supply circuit, and e) a horizontal deflection output circuit for generating a deflection current synchronized with said horizontal oscillation pulse.

2. The deflection apparatus of claim 1,
wherein said PWM voltage controller
   i) controls said PWM controlled power supply circuit so that the voltage output by said PWM controlled power supply circuit is substantially a lowest voltage at a specified timing, and
   ii) controls said PWM controlled power supply circuit so that the output voltage of said PWM, controlled power supply circuit is a voltage for obtaining a specified horizontal amplitude after changeover of the frequency of the horizontal oscillation pulse output by said oscillator.

3. The deflection apparatus of claim 1,
wherein said oscillation frequency switching controller outputs said frequency changeover signal when the output voltage of said PWM controlled power supply circuit becomes substantially a lowest voltage.

4. The deflection apparatus of claim 2,
wherein said oscillation frequency switching controller outputs said frequency changeover signal when the output voltage of said PWM controlled power supply circuit becomes substantially a lowest voltage.

5. A deflection apparatus comprising:
   a) a pulse width modulation (PWM) controlled power supply circuit for generating a supply voltage for obtaining a desired horizontal amplitude responsive to an input pulse synchronized with a horizontal synchronizing signal,
   b) a PWM voltage controller for discriminating a frequency of said horizontal synchronizing signal, and controlling the output voltage of said PWM controlled power supply circuit responsive to the frequency,
   c) an oscillator for outputting a horizontal oscillation pulse synchronized with said horizontal synchronizing signal,
   d) a polarity inverter for feeding a synchronizing signal inverted in polarity of the horizontal synchronizing signal to said oscillator during a predetermined period,
   e) a frequency discriminator for discriminating the frequency of said horizontal synchronizing signal, outputting a first control signal for inverting the polarity of the synchronizing signal to be supplied into said oscillator to said polarity inverter, and outputting a second control signal showing the changeover of said polarity inverter,
   f) an oscillation frequency switching controller for outputting a frequency changeover voltage to said oscillator in synchronism with said second control signal, and
   g) a horizontal deflection output circuit for generating a deflection current synchronized with said horizontal oscillation pulse.

6. The deflection apparatus of claim 5,
wherein said polarity inverter inverts the input synchronizing signal for said predetermined period so that said oscillator oscillates freely responsive to the output of said frequency discriminator.

7. The deflection apparatus of claim 5,
wherein said frequency discriminator outputs said first control signal during a predetermined time interval.

8. The deflection apparatus of claim 5,
wherein said oscillation frequency switching controller outputs said second control signal to said oscillator by delaying a predetermined time interval from said first control signal.

9. The deflection apparatus of claim 7,
wherein said oscillation frequency switching controller outputs said second control signal to said oscillator by delaying a predetermined time interval from said first control signal.

10. The deflection apparatus of claim 1, further comprising:
   a discharge circuit for discharging the output voltage of said PWM controlled power supply circuit when the power supply is cut off.

11. The deflection apparatus of claim 2, further comprising:
   a discharge circuit for discharging the output voltage of said PWM controlled power supply circuit when the power supply is cut off.

12. The deflection apparatus of claim 3, further comprising:
   a discharge circuit for discharging the output voltage of said PWM controlled power supply circuit when the power supply is cut off.

13. The deflection apparatus of claim 4, further comprising:
   a discharge circuit for discharging the output voltage of said PWM controlled power supply circuit when the power supply is cut off.

14. The deflection apparatus of claim 5, further comprising:
   a discharge circuit for discharging the output voltage of said PWM controlled power supply circuit when the power supply is cut off.

15. The deflection apparatus of claim 6, further comprising:
   a discharge circuit for discharging the output voltage of said PWM controlled power supply circuit when the power supply is cut off.

16. The deflection apparatus of claim 7, further comprising:
   a discharge circuit for discharging the output voltage of said PWM controlled power supply circuit when the power supply is cut off.

17. The deflection apparatus of claim 8, further comprising:
   a discharge circuit for discharging the output voltage of said PWM controlled power supply circuit when the power supply is cut off.

18. The deflection apparatus of claim 9, further comprising:
   a discharge circuit for discharging the output voltage of said PWM controlled power supply circuit when the power supply is cut off.

19. A driving method of a deflection apparatus having an oscillator for oscillating responsive to an input horizontal synchronizing signal, and a horizontal deflection output circuit provided with a supply voltage from a pulse width modulation (PWM) controlled power supply circuit and driven by an output signal of said oscillator, comprising the steps of:
   a) discriminating the frequency of a horizontal synchronizing signal,
   b) controlling to change the output voltage of said PWM controlled power supply circuit responsive to the result of discrimination at said step a) when the frequency of said horizontal synchronizing signal is changed from a first frequency to a second frequency,
   c) changing over the oscillation frequency of said oscillator driving said horizontal deflection output circuit to a frequency synchronized with a horizontal synchronizing signal having said second frequency when said output voltage becomes a predetermined voltage after the frequency of said horizontal synchronizing signal is changed from the first frequency to the second frequency, and d) supplying a voltage for obtaining a specified horizontal amplitude from said PWM controlled power supply circuit to said horizontal deflection output circuit, at the second frequency of said horizontal synchronizing signal, after changing over the frequency of said oscillator at said step c).

20. A driving method of a deflection apparatus having an oscillator for oscillating responsive to an input horizontal synchronizing signal, and a horizontal deflection output circuit provided with a supply voltage from a pulse width modulation (PWM) controlled power supply circuit and driven by an output signal of said oscillator, comprising the steps of:

a) discriminating the frequency of a horizontal synchronizing signal, b) changing the output voltage of said PWM controlled power supply circuit responsive to the result of discrimination at said step a) when the frequency of said horizontal synchronizing signal is changed from a first frequency to a second frequency, c) oscillating said oscillator asynchronously with said horizontal synchronizing signal during a predetermined time responsive to the result of discrimination at said step a) when the frequency of said horizontal synchronizing signal is changed from the first frequency to the second frequency, d) changing over the frequency of said oscillator to a frequency synchronized with the second frequency during said predetermined time, e) synchronizing the oscillation frequency of said oscillator to said horizontal synchronizing signal after changing over the frequency of said oscillator at said step d), and f) supplying a voltage for obtaining a specified horizontal amplitude at the frequency of said horizontal synchronizing signal from said PWM controlled power supply circuit to said horizontal deflection output circuit after said step e).

* * * * *